US 8,968,137 B2

(12) United States Patent
Bausch et al.

(10) Patent No.: US 8,968,137 B2
(45) Date of Patent: Mar. 3, 2015

(54) MOTOR VEHICLE DRIVE TRAIN

(75) Inventors: Jochen Bausch, Bietigheim (DE);
Guenter Ruehle, Loechgau (DE); Uli Christian Blessing, Heilbronn (DE)

(73) Assignee: GETRAG Getriebe-und Zahnradfabrik Hermann Hagenmeyer GmbH & Cie KG, Untergruppenbach (DE)

(*) Notice: Subject to any disclaimer, the term of this patent is extended or adjusted under 35 U.S.C. 154(b) by 197 days.

(21) Appl. No.: 13/491,431

(22) Filed: Jun. 7, 2012

(65) Prior Publication Data

US 2012/0316023 A1 Dec. 13, 2012

(30) Foreign Application Priority Data

Jun. 10, 2011 (DE) .......................... 10 2011 104 279

(51) Int. Cl.
*B60K 1/00* (2006.01)
*F16H 48/30* (2012.01)
*F16H 57/02* (2012.01)

(52) U.S. Cl.
CPC ............ *B60K 1/00* (2013.01); *F16H 57/02004* (2013.01); *B60K 2001/001* (2013.01)
USPC .......................... 475/150; 180/65.6; 180/65.7

(58) Field of Classification Search
CPC ........... B60K 17/06; B60K 17/16; B60K 6/36
USPC .................................. 475/150; 180/65.6, 65.7
See application file for complete search history.

(56) References Cited

U.S. PATENT DOCUMENTS

| 2,203,292 | A | | 6/1940 | Best |
| 2,320,757 | A | * | 6/1943 | Sinclair et al. .................. 74/337 |
| 3,425,301 | A | * | 2/1969 | Shannon ...................... 475/159 |
| 5,226,339 | A | * | 7/1993 | Donato et al. .................. 74/375 |
| 7,832,537 | B2 | * | 11/2010 | Blessing et al. ........... 192/48.91 |
| 2003/0060319 | A1 | | 3/2003 | Zeise |
| 2004/0130224 | A1 | | 7/2004 | Mogi et al. |

(Continued)

FOREIGN PATENT DOCUMENTS

| CN | 1065248 A | 10/1992 |
| CN | 101 704 340 A | 5/2010 |
| CN | 101 850 719 A | 10/2010 |

(Continued)

OTHER PUBLICATIONS

European Search Report in Application No. 12170837.4 dated Sep. 19, 2012, in 4 pages.

(Continued)

*Primary Examiner* — Tisha Lewis
(74) *Attorney, Agent, or Firm* — Knobbe Martens Olson & Bear, LLP

(57) ABSTRACT

Drive train for a motor vehicle, having an electric machine for providing motive power, and a transmission arrangement. The transmission arrangement has a transmission input shaft and a first and a second gear stage. The transmission input shaft is connected to the electric machine. The drive train has a differential, which is connected to an output of the transmission and is set up to distribute motive power to two drive shafts. The differential is connected to a helically toothed driving gear, which is in engagement with a helically toothed pinion of the transmission output. A pressure pad arrangement absorbs axial forces arising from the helical toothing.

14 Claims, 2 Drawing Sheets

(56) References Cited

U.S. PATENT DOCUMENTS

2012/0004062 A1* 1/2012 Kim .................................. 475/5
2014/0051538 A1* 2/2014 Wenthen et al. .............. 475/150

FOREIGN PATENT DOCUMENTS

| DE | 19917724 C2 | 1/2003 |
| DE | 10329870 B3 | 1/2005 |
| DE | 112009001011 T5 | 11/2009 |
| EP | 1 298 353 A2 | 4/2003 |
| FR | 2693527 | 1/1994 |
| FR | 2 928 583 A1 | 9/2009 |
| JP | 2004 050886 A | 2/2004 |

OTHER PUBLICATIONS

Chinese Office Actioin in related co-pending Application No. 201210187178.2, dated Aug. 5, 2014 in 8 pages.

* cited by examiner

MOTOR VEHICLE DRIVE TRAIN

CROSS REFERENCE TO RELATED APPLICATIONS

This application claims the priority of German patent application DE 10 2011 104 279.6, filed Jun. 10, 2011.

BACKGROUND OF THE INVENTION

The present invention relates to a drive train for a motor vehicle, having an electric machine for providing motive power, having a transmission arrangement, which has a transmission input shaft and a first and a second gear stage, wherein the transmission input shaft is connected to the electric machine, and having a differential, which is connected to an output of the transmission and is set up to distribute motive power to two drive shafts.

A motor vehicle drive train of this kind is known from document DE 199 17 724 C2.

This document discloses the provision of a drive train for an electric vehicle, in which the drive train has a 2-speed power-shift transmission. In this case, an electric machine is connected by way of a constant-mesh gearset to a transmission input shaft, on which two free gears are rotatably mounted. The free gears can be connected to the transmission input shaft by means of friction clutches capable of making power shifts. The differential is furthermore connected to two driving gears, which are directly in engagement with the free gears. In this way, it is possible to provide a compact drive train for an electrically driven motor vehicle. By means of the two gear stages, it is possible to achieve a gear spread which allows operation both in urban conditions and in extraurban conditions.

The disadvantage with this drive train is the use of two relatively large ring gears (driving gears) on the differential, specifically in terms of weight, inertia and production costs.

BRIEF SUMMARY OF THE INVENTION

Given this background, it is an object of the invention to provide an improved drive train for a motor vehicle, in particular a motor vehicle with purely electric drive, which is advantageous in terms of weight and efficiency.

According to a first aspect of the present invention, this object is achieved, in a drive train having an electric machine for providing motive power, having a transmission arrangement, which has a transmission input shaft and a first and a second gear stage, wherein the transmission Input shaft is connected to the electric machine, and having a differential, which is connected to an output of the transmission and is set up to distribute motive power to two drive shafts, by the fact that the differential is connected to a helically toothed driving gear, which is in engagement with a helically toothed pinion of the transmission output, wherein a pressure pad arrangement absorbs axial forces arising from the helical toothing.

In this embodiment, it is preferred if the differential is connected to the output of the transmission via only one driving gear. This makes it possible to produce the drive train with a lower weight and lower production costs as well as a lower inertia at the differential. This also makes it possible to save installation space. The driving gear and the pinion are preferably designed as spur gears. it is thereby possible to create an arrangement in which the electric machine is aligned parallel to the drive shafts.

Here, the drive shafts are preferably drive shafts for driven wheels of the motor vehicle. In this case, the shafts of the drive train are preferably aligned transversely to a longitudinal axis of the motor vehicle. However, it is also conceivable for the differential to distribute motive power to two drive shafts, which distribute the motive power to a front axle and a rear axle of the vehicle.

However, it is preferred if the drive train is fitted either at the front of the motor vehicle in order to drive the front axle or at the rear of the motor vehicle in order to drive the rear axle.

By means of the pressure pad arrangement, it is possible for the axial forces arising from the helical toothing to be absorbed directly in the gearset. Consequently, the axial forces are not transmitted to rolling bearings by means of which a shaft of the pinion and/or the differential are rotatably mounted. As a result, it is possible to dispense with expansive rolling bearing arrangements, especially for mounting the shaft of the pinion.

The differential is preferably connected only to one driving gear (ring gear). Consequently, there is the possibility of connecting different ring gears, thus enabling the differential to be designed as a "carry-over" differential. In particular, it is possible to use different differentials, e.g. a standard differential, a sports differential, a controllable locking differential or an active-yaw differential with two friction clutches.

The use of pressure pads is already known in other areas of application. The pressure pad arrangement is preferably embodied as described in document DE 103 29 870 B3. The disclosure thereof is therefore to be incorporated fully by reference here.

Moreover, axial installation space can be saved by using just one driving gear, which is connected to the differential.

The object is thus fully achieved.

It is particularly preferred if the pinion is fixed on an intermediate shaft, which is mounted parallel to the transmission input shaft.

In this embodiment, therefore, an intermediate shaft is provided. It is thereby possible to keep the level of torque flowing through the transmission arrangement to a low level, thus allowing the associated transmission components to be given correspondingly small dimensions. It is only in the final stage (from the intermediate shaft to the differential) that the torque is converted to the required level. To enable the axial forces which arise with helical toothing at these high torque levels, the pressure pad arrangement has proven particularly advantageous so as to enable expensive bearings to be dispensed with.

The two gear stages are preferably set up between the transmission input shaft and the intermediate shaft. Although the speed level in these gear stages may thon be higher than in the prior art, the torques to be transmitted are lower, and therefore the two gear stages can be constructed with smaller components and, in particular, can be made narrower in the axial direction. In general, it is possible for the pinion on the intermediate shaft to be arranged laterally adjacent to two gearwheels of the two gear stages. In this case, it is also possible to implement a coaxial drive, e.g. by arranging the electric machine coaxially with one of the drive shafts.

However, it is particularly preferred if the pinion is arranged between a first gearwheel, which is assigned to the first gear stage, and a second gearwheel, which is assigned to the second gear stage, in the axial direction.

In this embodiment, it is possible to achieve a substantially symmetrical construction. As a result, the rolling bearings to be used can likewise be given smaller dimensions.

In another embodiment, which is preferred overall, a first gearwheel, which is assigned to the first gear stage, and/or a second gearwheel, which is assigned to the second gear stage, are each designed as free gears rotatably mounted on an intermediate shaft.

Here, the intermediate shaft is preferably the one on which the pinion is fixed.

In this embodiment, the actuator system for selecting the gear stages can be arranged in the region of the intermediate shaft, and this can contribute to a radially compact construction. This is because, in this case, gearwheels with a relatively small diameter can be provided in the region of the transmission input shaft.

It is advantageous here if the first gearwheel can be connected to the intermediate shaft by means of a first clutch, and/or if the second gearwheel can be connected to the intermediate shaft by means of a second clutch.

The clutches can be designed as dog clutches or as synchronized selector clutches. However, it is particularly preferred if these clutches are designed as power-shift clutches in the form of friction clutches, in particular wet friction clutches, such as multi-plate clutches.

In this arrangement, the clutches can be arranged in the region between the first gearwheel and the second gearwheel. However, it is particularly preferred if the pinion is fixed between the gearwheels and if the clutches are each arranged axially on the outside in relation to the gearwheels. In this embodiment, the actuator system can also be integrated more easily into the drive train.

It is furthermore preferred overall if the first gearwheel is in engagement with a first mating gearwheel, which is mounted on the transmission input shaft, and/or if the second gearwheel is in engagement with a second mating gearwheel, which is mounted on the transmission input shaft.

In this case, the mating gearwheels are preferably connected for conjoint rotation to the transmission input shaft, as fixed gears.

In this embodiment, the transmission arrangement can be designed with two parallel shafts, namely the transmission input shaft and the intermediate shaft. It is thus possible overall to achieve a design which is compact, both radially and axially.

Another preferred embodiment according to a second aspect relates to a drive train having an electric machine for providing motive power, having a transmission arrangement, which has a transmission input shaft and a first and a second gear stage, wherein the transmission input shaft is connected to the electric machine, and having a differential, which is connected to an output of the transmission and is set up to distribute motive power to two drive shafts, wherein the transmission input shaft or a machine shaft of the electric machine is designed as a hollow shaft, with the other shaft being designed as an inner shaft, which projects into the hollow shaft and is connected to the hollow shaft by a toothed section.

In this case, it is possible, on the one hand, to implement the assembly of the drive train easily. Here, the inner shaft can be designed as a solid shaft or itself be designed as a hollow shaft.

The toothed section, in the form, for example, of a toothed hub profile on the inner circumference of the hollow shaft, on the one hand, and on the outer circumference of the inner shaft, on the other hand, can be lubricated with a lubricant, e.g. oil, if appropriate.

It is particularly preferred here if the toothed section is spaced apart axially from radial bearings for the rotatable mounting of the transmission input shaft and/or of the machine shaft.

A certain elasticity (flexibility in bending) of the machine shaft of the electric machine can be achieved by means of this spacing of the toothed section (e.g. in the form of splines) from the main bearings of the electric machine. This reduces the constraint forces in the toothed section in the case of errors in the positioning of the electric machine relative to the transmission arrangement, and consequently increases the life of the toothed section.

It is advantageous here if the toothed section is arranged in an axial region between two gearwheels mounted on the shaft.

In this embodiment, a relatively large axial spacing between the radial bearings of the hollow shaft can be achieved.

In general, there is freedom of choice as to the axial position of the toothed section. However, it is particularly advantageous if the free length of the machine shaft is as long as possible.

For reasons of rigidity, it may even be preferred if the toothed section is arranged in the region radially within a gearwheel mounted on the shaft.

Another embodiment according to a third aspect relates to a drive train having an electric machine for providing motive power, having a transmission arrangement, which has a transmission input shaft and a first and a second gear stage, wherein the transmission input shaft is connected to the electric machine, and having a differential, which is connected to an output of the transmission and is set up to distribute motive power to two drive shafts, wherein the two gear stages are set up between the transmission input shaft and an intermediate shaft, on which a pinion of the transmission output is fixed, and a parking lock arrangement is arranged between the intermediate shaft and a housing.

Since the intermediate shaft is connected to the drive shafts by way of the pinion and the differential, a parking lock arrangement can be arranged in the region of the intermediate shaft. Admittedly, arrangement of the parking lock arrangement on one of the drive shafts is also possible. However, the parking lock arrangement would have to be of larger dimensions there, owing to the higher torques which prevail at that point.

The parking lock arrangement is preferably arranged axially adjacent to one of two clutches assigned to the intermediate shaft.

It is furthermore preferred overall if the gear stages are each formed by helically toothed gearsets, wherein the direction of the helix of the gearsets is chosen in such a way that the axial forces that arise therefrom are opposed to respective directions of actuation of clutches, by means of which the gearsets can be selected for power transmission.

Since the axial forces which arise from the meshing of the driving gear and the pinion are preferably absorbed by the pressure pad arrangement, there is freedom of choice in the direction of the helix of the gear stage gearsets. It is therefore possible to choose the direction of the helix of said gearsets in such a way that compensation by means of the actuating force of the clutches is possible at the free gears.

It goes without saying that the features mentioned above and those which will be explained below can be employed not only in the respectively indicated combination but also in other combinations or in isolation without exceeding the scope of the present invention.

BRIEF DESCRIPTION OF THE DRAWING

Embodiments of the invention are illustrated in the drawing and explained in greater detail in the following description. In the drawing.

DETAILED DESCRIPTION OF THE INVENTION

Figure 1:
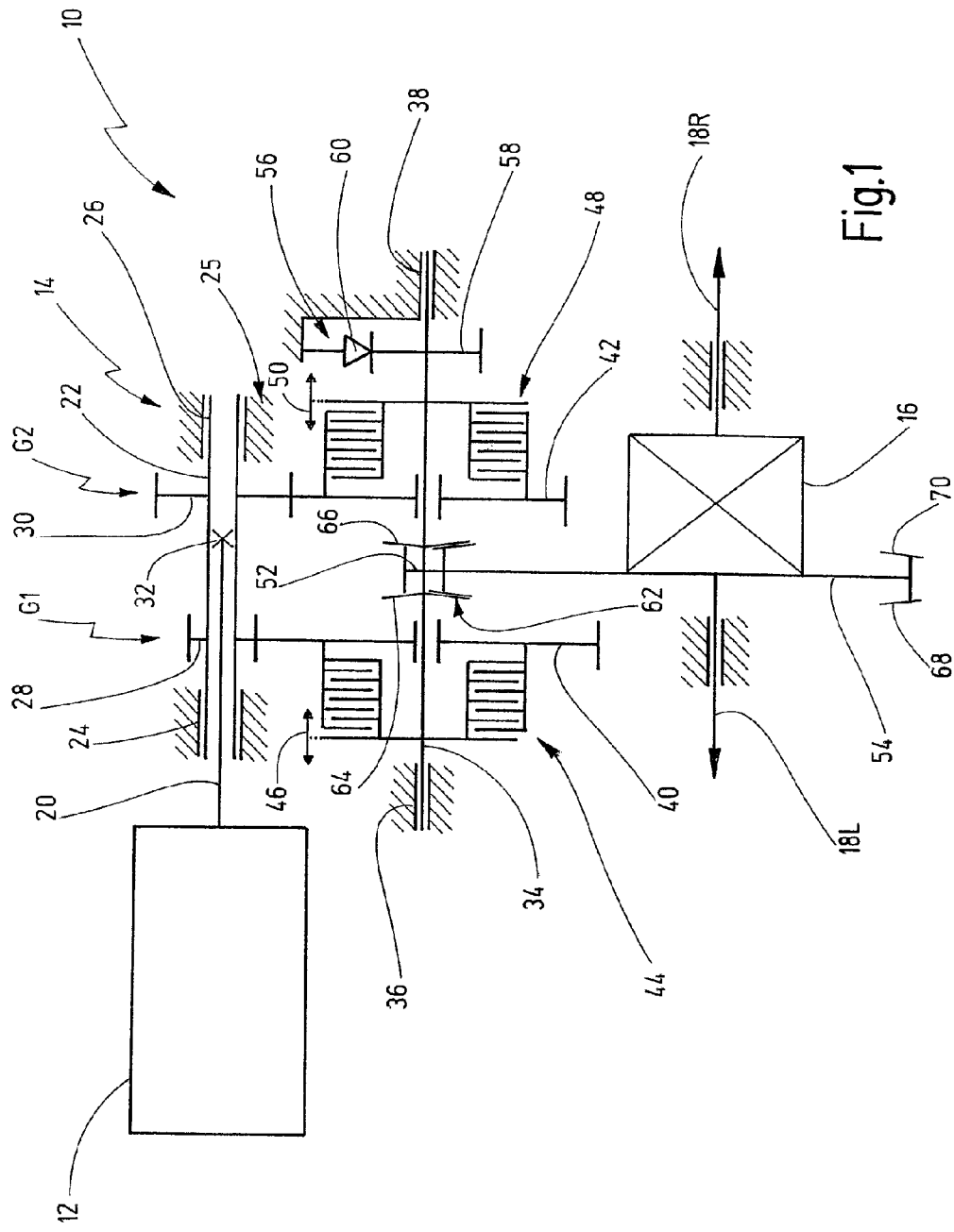
FIG. 1 shows a schematic longitudinal section through one embodiment of a drive train according to the invention.

In FIG. 1, a drive train for a motor vehicle is denoted overall by 10. The drive train 10 has an electric machine 12, which is designed to provide motive power (in motor mode).

The drive train 10 furthermore contains a transmission arrangement 14, the input of which is coupled to the electric machine 12 and the output of which is connected to a differential 16. The differential 16 is designed to distribute the motive power to a left-hand and a right-hand drive shaft 18L, 18R. The drive shafts 18L, 18R can be connected to wheels on a driven axle. However, it is also possible for the drive shafts 18L, 18R to be used to distribute the motive power to two different axles.

The electric machine 12 has a machine shaft 20. The transmission arrangement 14 has a transmission input shaft 22, which is preferably arranged coaxially with the machine shaft 20 and is coupled to the latter.

The transmission input shaft 22 is mounted rotatably on a housing 25 by means of a first bearing 24 and by means of a second bearing 26.

The transmission input shaft 22 is furthermore connected for conjoint rotation to a first fixed gear 28 of a first gear stage G1 and to a second fixed gear 30 of a second gear stage G2.

The transmission input shaft 22 is designed as a hollow shaft, and the motor shaft 20 is inserted into the transmission input shaft 22 in the axial direction. The connection for conjoint rotation between the machine shaft 20 and the transmission input shaft 22 is made by means of a toothed section 32, which is arranged as far as possible from a support for the machine shaft 20 and/or from the bearings 24, 26. This makes it possible for the machine shaft 20 to have a certain elasticity. Positioning errors during the assembly of the electric machine 12 and the transmission arrangement 14 can thereby be reduced.

The toothed section 32 is preferably formed by an internally toothed section of the transmission input shaft 22 and an externally toothed section of the machine shaft 20.

The transmission arrangement 14 furthermore contains an intermediate shaft 34, which is arranged parallel to the transmission input shaft 22, in the manner of a layshaft. The intermediate shaft 34 is mounted rotatably on the housing 25 by means of a third bearing 36 and by means of a fourth bearing 38.

A first free gear 40 of the first gear stage G1 and a second free gear 42 of the second gear stage G2 are rotatably mounted on the intermediate shaft 34. The first free gear 40 is in engagement with the first fixed gear 28. The second free gear 42 is in engagement with the second fixed gear 30.

A first clutch 44 in the form of a wet multi-plate clutch is arranged between the first free gear 40 and the third bearing 36. The first clutch 44 is designed as a power-shift clutch and serves to connect the first free gear 40 to the intermediate shaft 34 or to separate it therefrom. A direction of actuation of the first clutch 44 is shown at 46. A second clutch 48 is furthermore arranged on the intermediate shaft 34, more specifically between the second free gear 42 and the fourth bearing 38 in the axial direction. The second clutch 48 is likewise designed as a power-shift clutch, in particular in the form of a wet multi-plate clutch. The direction of actuation of the second clutch 48 is shown at 50.

Since the two clutches 44, 48 are designed as friction clutches capable of power shifts, gear changes from the first gear stage G1 to the second gear stage G2 can be carried out without an interruption in tractive force, with the two clutches 44, 48 being actuated in an overlapping manner (as in a dual-clutch transmission).

A pinion 52 is connected for conjoint rotation to the intermediate shaft 34, between the first free gear 40 and the second free gear 42. As an alternative, it is also possible to arrange the pinion 52 adjacent to the two free gears 40, 42 with an offset in the axial direction. In this case, it is also conceivable to arrange the two clutches 44, 48 between the two free gears 40, 42.

The pinion 52 is in engagement with a driving gear or ring gear 54, which is rigidly connected to an input member of the differential 16.

When the first clutch 44 is closed, motive power from the electric machine 12 is thus transmitted via the gearwheels 28, 40 of the first gear stage G1 and the pinion 52 to the input member of the differential 16. In the second gear stage G2, the motive power is transmitted from the electric machine, via the gearwheels 30, 42 of the second gear stage G2 and via the pinion 52 to the input member of the differential 16.

A parking lock arrangement 56 is arranged between one of the clutches 44, 48 (in the present case clutch 48) and a section of the housing 25. The parking lock arrangement 56 has a parking lock gear 58, which is connected for conjoint rotation to the intermediate shaft 34. The parking lock arrangement 56 furthermore has a schematically indicated parking lock pawl 60, which is generally pivotably mounted on the housing 25.

The pinion 52 and the driving gear 54 are each helically toothed gearwheels, in particular for the purpose of low noise generation.

In order to avoid a situation where the axial forces which arise therefrom are introduced into the intermediate shaft 34 via the intermeshing of the pinion 52 and driving gear 54 as the torque is transmitted, a pressure pad arrangement 62 is provided.

The pressure pad arrangement 62 has a first pressure pad 64, which is connected to the pinion 52 (or to the intermediate shaft 34 in a position adjacent to the pinion 52) on one axial side. With appropriate configuration, a single pressure pad 64 of this kind may be sufficient. In general, the first pressure pad 64 is mounted on the pinion 52 on the side in the direction of which axial forces are oriented as the motor vehicle travels forward in tractive operation. If axial forces are also supposed to be absorbed during forward travel in overrun operation and/or in reverse (under traction), a second pressure pad 66 is also arranged on the pinion 52 on the axially opposite side. With two pressure pads 64, 66, axial forces can be absorbed in all states (four-quadrant operation).

Given appropriate configuration of the first pressure pad 64 and of the second pressure pad 66, the axial forces can be introduced directly, especially if the configuration of the pressure pads 64, 66 is as described in document DE 103 29 870 B3.

As an alternative, it is also possible to fix a first thrust surface 68 on the driving gear 54 on one axial side, said surface transmitting the axial forces to the first pressure pad 64 (or vice versa). As mentioned above, the first thrust surface 68 preferably transmits forces which arise during forward travel under fraction (or when reversing in overrun). If forces are also supposed to be absorbed during forward travel in overrun or when reversing under traction, a second thrust surface 70 is also arranged on the axially opposite side on the driving gear 54, said surface transmitting the axial forces to the second pressure pad 66.

It goes without saying that the pressure pads 64, 66 can also be fixed on. the driving gear 54, in which case corresponding first and second thrust surfaces 68, 70 are preferably fixed on the pinion 52.

The following modifications of the above drive train 10 are conceivable. The electric machine 12 can also be arranged so as to be offset in parallel with the transmission input shaft 22. In this case, an output shaft of the electric machine 12 can be coupled by way of a gearset or some other mechanism to a machine shaft which is connected to the transmission input shaft 22. In this case, it is also possible for the electric machine 12 to be arranged coaxially with one of the drive shafts 18L, 18R (see FIG. 3).

It is also possible for the parking lock arrangement 56 to be arranged in the region of the drive shafts 18L, 18R. In this case, however, the parking lock arrangement 56 must be made more massive since there are higher torques applied in this region. In the latter case, the fixed gears 28, 30 and the free gears 40, 42 could also be interchanged, such that the free gears 40, 42 with the associated clutches 44, 48 are arranged on the transmission input shaft 22.

Overall, the drive train 10 provides a two-speed powershift drive train for electric vehicles. In general, however, it is also possible to couple the transmission Input shaft 22 additionally to an internal combustion engine. In this case, the drive train could be embodied as a hybrid drive train of the range extender type.

With the drive train 10, a very good efficiency is achieved. The high axial gearing forces arising in the final transmission stage (pinion 52/driving gear 54) and the resulting tilting moments do not have to be supported by expensive rolling bearings. On the contrary, the axial forces are absorbed within the gears and are therefore not passed on for support to the rolling bearings. The parking lock arrangement 56 is arranged on the intermediate shaft 34 in the region of a wall of the housing 25. The transmission input shaft 22 is embodied as a shaft with a hub profile in order to provide the interface for torque transmission from the machine shaft 20 to the transmission input shaft 22 as far as possible away from the main support provided by bearings 24 and 26. As a result, constraint forces in the hub profile due to position tolerances can be reduced as soon as possible.

Since the differential 16 is preferably connected to only one driving gear (ring gear 54), which must have a correspondingly high weight, the total weight can be significantly reduced as compared with arrangements in which the differential is connected to two driving gears.

Since only one driving gear 54 is provided, the axial installation space can be reduced. Since the intermediate shaft 34 always rotates along with the differential 16, the parking lock arrangement 56 can be arranged in the region of the intermediate shaft 34, where it can be given smaller dimensions.

In order to keep down the torque level in both gear stages G1, G2, the torque is converted predominantly in the final stage (pinion 52/driving gear 54). The two gear stages G1, G2 are then arranged on the transmission input shaft 22 and the intermediate shaft 34. Although this increases the speed level in this region, the torques for the individual gearsets 28/40 and 30/42 are lower. These gearwheels can therefore be made narrower.

The direction of the helix of the gearsets 28/40 and 30/42 can be chosen so that the axial forces which arise are in each case compensated for by the actuating forces of the clutches 44, 48.

Figure 2:
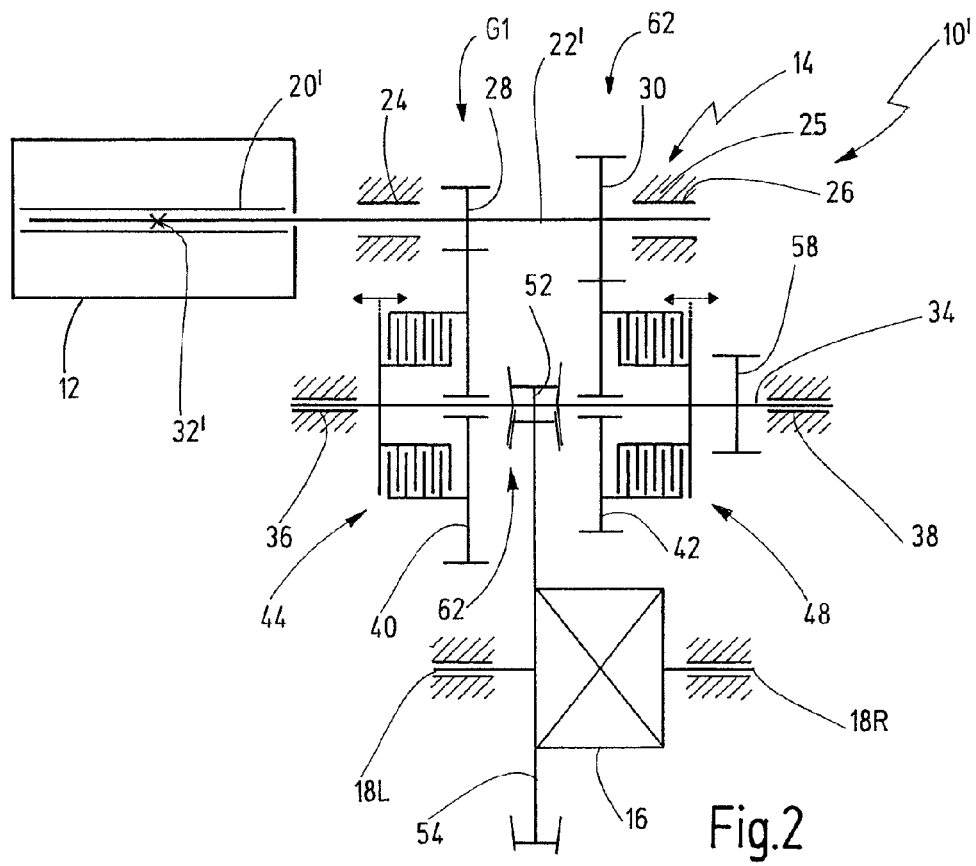
FIG. 2 shows a schematic longitudinal section through another embodiment of a drive train according to the invention.
Figure 3:
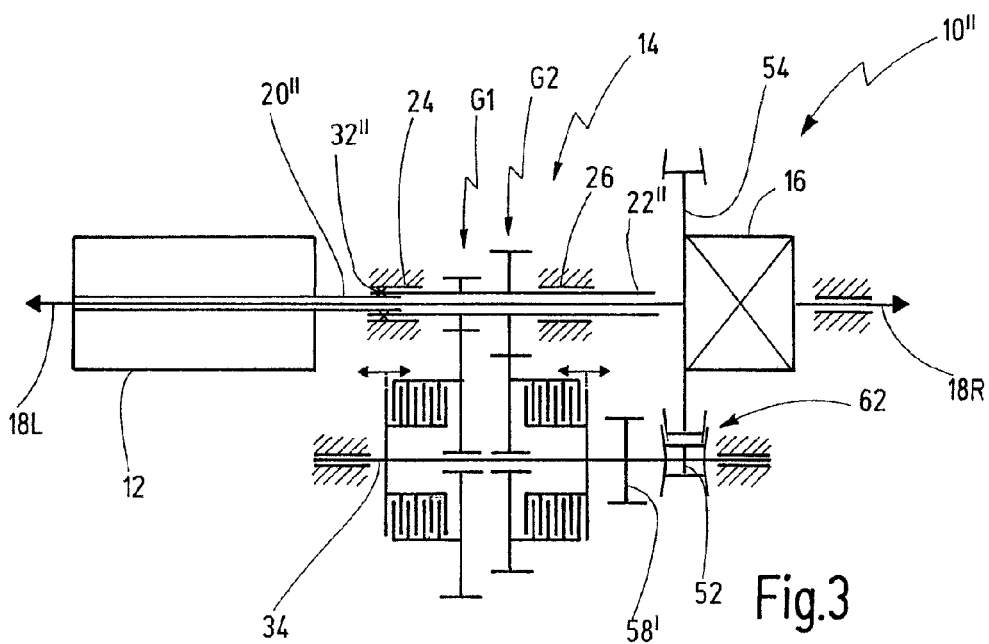
FIG. 3 shows a longitudinal section through another embodiment of a drive train according to the invention.

Additional embodiments of hybrid drive trains 10', 10" are shown in FIGS. 2 and 3. In terms of construction and operation, these correspond in general terms to the drive train 10 in FIG. 1. Identical elements are therefore denoted by identical reference signs. It is essentially the differences which are explained below.

The drive train 10' in FIG. 2 differs from that in FIG. 1 essentially in that the transmission input shaft 22' is designed as a solid shaft. The machine shaft 20' is designed as a hollow shaft. The machine shaft 20' can be a rotor shaft contained in the housing of the electric machine 12.

In the embodiment in FIG. 2, the transmission input shaft 22' is inserted into the machine shaft 20' in such a way that a toothed section 32' can be provided within the housing of the electric machine 12, for example.

As an alternative, it is, of course, also possible for the machine shaft 20' to extend out of the housing of the electric machine 12 and to be connected by way of a toothed section 32' to the transmission input shaft 22' in this projecting section.

In the case of the drive train 10" in FIG. 3, the transmission input shaft 22" is once again designed as a hollow shaft. Moreover, the machine shaft 20" is also designed as a hollow shaft which extends out of the housing of the electric machine 12 and is inserted into the transmission input shaft 22" (or vice versa). A corresponding toothed section 32" is shown schematically as being radially within the first bearing 24, but it can also be arranged behind the second bearing 26 in the axial direction. In the latter case, the free length of the machine shaft 20" is greater, thus providing greater elasticity and lower sensitivity to positioning errors.

In this embodiment, the electric machine 12 is furthermore arranged co-axially with one of the drive shafts, in the present case coaxially with drive shaft 18L. In this case, the drive shaft 18L runs through the transmission input shaft 22" in the axial direction and furthermore axially through the machine shaft 20" until the drive shaft 18L emerges on the opposite side of the electric machine 12 from the differential 16 and is there connected to a driven wheel or the like.

In this embodiment, the pinion 52 is not arranged between the gearsets for gear stages G1, G2 but adjacent thereto in the axial direction, facilitating the design of the connection to a driving gear 54 of the differential 16.

What is claimed is:
1. Drive train for a motor vehicle, having
an electric machine for providing motive power;
a transmission arrangement, which has a transmission input shaft and a first and a second gear stage, wherein the transmission input shaft is connected to the electric machine;
a differential, which is connected to an output of the transmission and is set up to distribute motive power to two drive shafts;
wherein the differential is connected to a helically toothed driving gear, which is in engagement with a helically toothed pinion of the transmission output, wherein a pressure pad arrangement absorbs axial forces arising from the helical toothing, wherein the pinion is fixed on an intermediate shaft, which is mounted parallel to the transmission input shaft, and wherein the pinion is arranged between a first gearwheel, which is assigned to the first gear stage, and a second gearwheel, which is assigned to the second gear stage, in the axial direction.
2. Drive train according to claim 1, wherein at least one of the first gearwheel, which is assigned to the first gear stage, and the second gearwheel, which is assigned to the second gear stage, is designed as a free gear rotatably mounted on the intermediate shaft.

3. Drive train according to claim 1, wherein the first gearwheel can be connected to the intermediate shaft by means of a first clutch.

4. Drive train according to claim 1, wherein the second gearwheel can be connected to the intermediate shaft by means of a second clutch.

5. Drive train according to claim 1, wherein the first gearwheel is in engagement with a first mating gearwheel, which is mounted on the transmission input shaft.

6. Drive train according to claim 1, wherein the second gearwheel is in engagement with a second mating gearwheel, which is mounted on the transmission input shaft.

7. Drive train according to claim 1, wherein the transmission input shaft or a machine shaft of the electric machine is designed as a hollow shaft, with the other shaft being designed as an inner shaft, which projects into the hollow shaft and is connected to the hollow shaft by a toothed section.

8. Drive train according to claim 7, wherein the toothed section is spaced apart axially from radial bearings for the rotatable mounting of at least one of the transmission input shaft and the machine shaft.

9. Drive train according to claim 1, wherein the two gear stages are set up between the transmission input shaft and the intermediate shaft, on which the pinion of the transmission output is fixed, and a parking lock arrangement is arranged between the intermediate shaft and a housing.

10. Drive train according to claim 1, wherein the gear stages are each formed by helically toothed gearsets, wherein the direction of the helix of the gearsets is chosen in such a way that the axial forces that arise therefrom are opposed to respective directions of actuation of clutches, by means of which the gearsets can be selected for power transmission.

11. Drive train for a motor vehicle, having
an electric machine for providing motive power;
a transmission arrangement, which has a transmission input shaft and a first and a second gear stage, wherein the transmission input shaft is connected to the electric machine;
a differential, which is connected to an output of the transmission and is set up to distribute motive power to two drive shafts;
wherein the two gear stages are set up between the transmission input shaft and an intermediate shaft, on which a pinion of the transmission output is fixed, and a parking lock arrangement is arranged between the intermediate shaft and a housing, wherein the pinion is fixed on an intermediate shaft, which is mounted parallel to the transmission input shaft, and wherein the pinion is arranged between a first gearwheel, which is assigned to the first gear stage, and a second gearwheel, which is assigned to the second gear stage, in the axial direction.

12. Drive train according to claim 11, wherein at least one of the first gearwheel, which is assigned to the first gear stage, and the second gearwheel, which is assigned to the second gear stage, is designed as a free gear rotatably mounted on the intermediate shaft.

13. Drive train according to claim 11, wherein the transmission input shaft or a machine shaft of the electric machine is designed as a hollow shaft, with the other shaft being designed as an inner shaft, which projects into the hollow shaft and is connected to the hollow shaft by a toothed section.

14. Drive train according to claim 13, wherein the toothed section is spaced apart axially from radial bearings for the rotatable mounting of at least one of the transmission input shaft and the machine shaft.

* * * * *